United States Patent [19]
LeCompte

[11] Patent Number: 5,209,416
[45] Date of Patent: May 11, 1993

[54] HIGH DENSITY FILAMENT WINDING AND METHOD FOR PRODUCING IMPROVED CROSSOVERS AND INSIDE PAYOUT

[75] Inventor: George W. LeCompte, Tucson, Ariz.

[73] Assignee: Hughes Aircraft Company, Los Angeles, Calif.

[21] Appl. No.: 915,224

[22] Filed: Jul. 20, 1992

Related U.S. Application Data

[62] Division of Ser. No. 737,818, Jul. 29, 1991, Pat. No. 5,154,366.

[51] Int. Cl.$^5$ ............... B65H 54/00; B65H 55/04; B65H 75/02
[52] U.S. Cl. ............................ 242/47; 242/117; 242/159
[58] Field of Search ............ 242/47, 117, 118.4, 242/118.7, 159, 172, 173, 174, 175, 176, 177, 178, 1, 18 R, 18 G, 50, 158 R, 158.3

[56] References Cited

U.S. PATENT DOCUMENTS

| | | | |
|---|---|---|---|
| 1,504,005 | 8/1924 | Vienneau | 242/117 X |
| 2,639,097 | 5/1953 | Scott, Jr. | 242/171 X |
| 2,709,553 | 5/1955 | Wellcome | 242/171 X |
| 2,732,150 | 1/1956 | LeBus, Sr. | 242/117 |
| 2,734,695 | 2/1956 | LeBus, Sr. | 242/117 |
| 3,150,844 | 9/1964 | LeBus, Sr. | 242/117 |
| 3,272,454 | 9/1966 | Lane et al. | 242/117 |
| 3,391,443 | 7/1968 | LeBus, Sr. | 242/117 X |
| 3,391,879 | 7/1968 | LeBus, Sr. | 242/117 |
| 3,399,846 | 9/1968 | LeBus, Sr. | 242/117 |
| 3,783,180 | 1/1974 | Spicer | 242/173 X |
| 4,005,834 | 1/1977 | Landreau | 242/158.3 |
| 4,071,205 | 1/1978 | Wieschel | 242/117 |
| 4,354,645 | 10/1982 | Glavas et al. | 242/117 |
| 4,483,496 | 11/1984 | Weinlich | 242/158 R |
| 4,752,043 | 6/1988 | Heinzer | 242/159 X |

FOREIGN PATENT DOCUMENTS

| | | | |
|---|---|---|---|
| 717497 | 10/1931 | France | 242/176 |
| 295973 | 12/1986 | Japan | 242/159 |
| 2003450 | 3/1979 | United Kingdom | 242/159 |

Primary Examiner—Stanley N. Gilreath
Attorney, Agent, or Firm—C. D. Brown; R. M. Heald; W. K. Denson-Low

[57] ABSTRACT

Method and apparatus for making a filament winding amenable to inside payout and having squared-off ends providing optimal volumetric efficiency. The filament crossovers are distributed so as to reduce crossover stacking in one or a few places which can interfere with winding and payout from the finished winding. A base wire layer is wrapped onto a mandrel over which a guide is nestingly wound with adjacent guide wire turns spaced apart. The filament first layer is wound nesting in the guide wire spaces, and subsequent filament layers accordingly formed. Each crossing filament turn has an advance in a crossing region substantially aligned with a crossover region in the underlying layer and which in one embodiment is one-half the winding pitch.

3 Claims, 7 Drawing Sheets

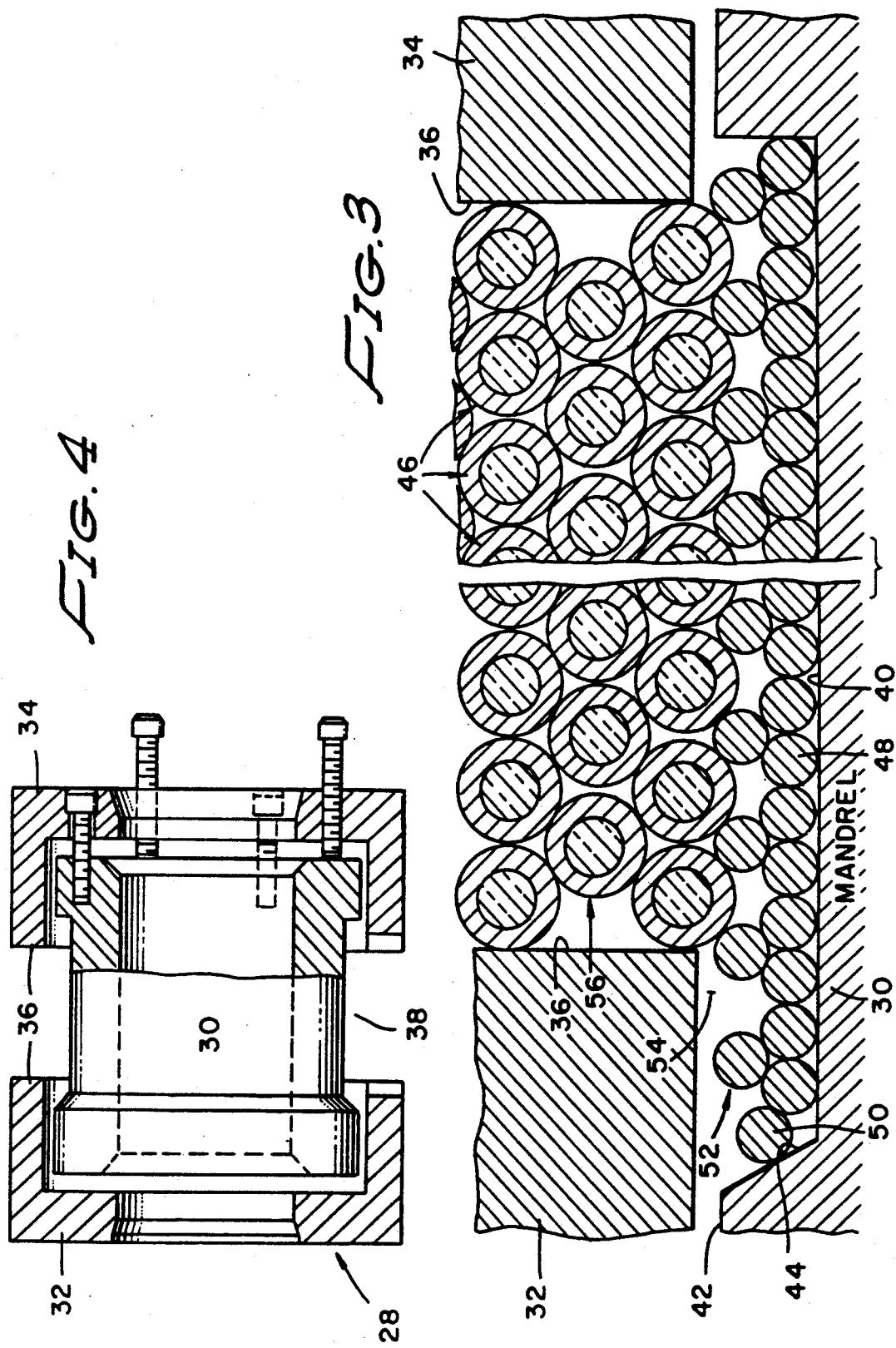

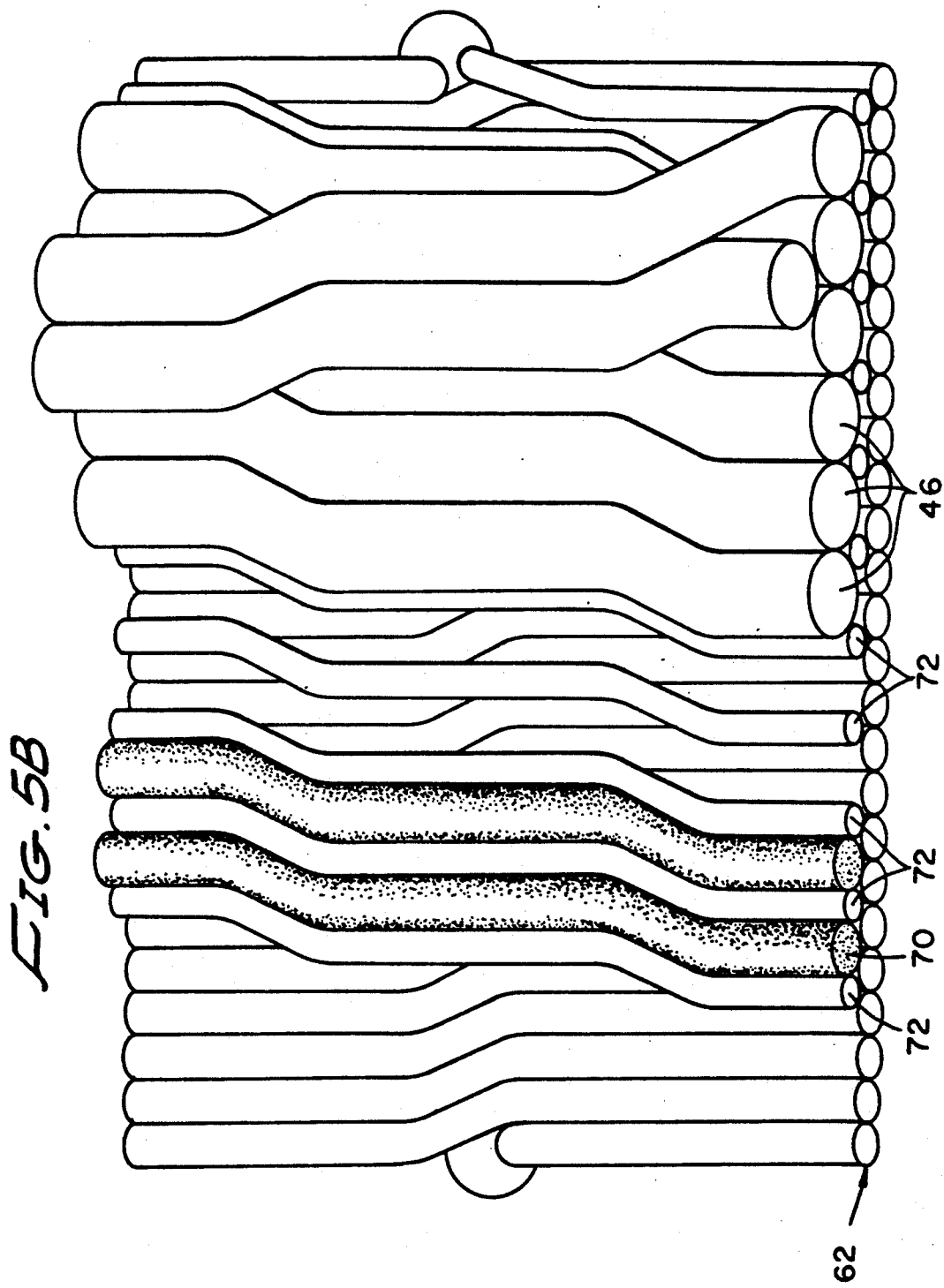

HIGH DENSITY FILAMENT WINDING AND METHOD FOR PRODUCING IMPROVED CROSSOVERS AND INSIDE PAYOUT

This is a division of application Ser. No. 07/737,818, filed Jul. 29, 1991, now U.S. Pat. No. 5,154,366.

BACKGROUND OF THE INVENTION

1. Field of the Invention

The present invention relates generally to winding filaments, and, more particularly, to a winding of high packing density and a method of making.

2. Description of Related Art

This invention is related to my pending application Deep Nested Filament Winding, Ser. No. 270,885, filed Nov. 14, 1988, a continuation of 069,353, Jul. 2, 1987 now abandoned.

There are situations in which it is desirable to be able to pay out a metal wire or optical fiber of considerable length for use as a data link. For example, many present day weapon systems include a launched missile with a wire or fiber optic data link wound on a bobbin or spool which pays out at a very high rate of speed during use.

Several criteria must be met in order to provide a satisfactory winding which can act as a missile data link. First of all, payout must be accomplished with a minimum of tension on the filament to prevent breakage, or in the case of an optical fiber even to prevent microbending which reduces signal transmission. Secondly, the winding should be stable so as to permit storage without collapsing from its wound configuration. Lastly, the winding should be dense and compact so as to take as little space as necessary.

Certain present day high speed filament dispensers have the filament in one layer nest between turns of adjacent layers. To maintain this condition, in certain known dispensers each layer is stepped back several turns from the underlying layer. This results in tapered ends for the winding which reduces volumetric efficiency.

A disadvantage especially found in cylindrical layered windings is the frictional drag on payout resulting from an outer layer being removed from an underlying layer. One way of reducing this problem is to provide a winding having an inside-out payout which not only provides exceptional volumetric efficiency but allows the winding to be stored without being subjected to undesirably high levels of tensile stress. This latter point is important especially for optical fiber cables which are subject to static fatigue and optical signal attenuation due to loads imposed by winding.

Known inside payout dispensers employ a "basket weave" winding technique which results in a substantial amount of empty space reducing volumetric efficiency. Moreover, the relatively large effective pitch of such a winding causes a correspondingly large modulation in instantaneous payout velocity reducing achievable vehicle speed for a given filament strength.

It is also desirable for windings, especially inside payout windings, to have squared ends. However, closely packed windings with squared ends are not easily wound, and in the past were not obtainable by high speed, automatic techniques.

The foregoing problems have been exacerbated by the problem of crossovers. Crossovers heretofore have generally advanced a full pitch at each crossover region of a winding turn and/or have resulted in windings with irregular (i.e., non-squared) ends. See in this connection, Winding Long Slender Coils By The Orthocyclic Method by Halder W. C. Aamot, Special Report 128, U.S. Army Materiel Command, February 1969. Such uncontrolled crossovers have required frequent manual "massage" to minimize winding disturbances, bulges, and other irregularities which may prevent successful winding and payout, and reduce volumetric efficiency.

SUMMARY OF THE INVENTION

There is provided in accordance with the present invention a filament winding (e.g., wire, optical fiber) in which each layer has a plurality of turns nested between turns of the underlying layer, each turn crossing over underlying turns in at least two regions. Each crossing filament turn has an advance in a crossing region which substantially aligns with a crossover region in the underlying layer. The winding so produced enables achieving a winding having squared ends and enhanced volumetric efficiency.

These windings can be made by high-speed, automatic machine techniques. One especially advantageous use of windings described here made in the inside payout form, is to provide a data link from a launched missile to its launch site.

The winding method of the invention includes laying down a base wire layer on a mandrel over which a guide layer is formed, the guide layer turns being nested in the wire layer and spaced apart. The filament winding is formed by nesting in the interturn spaces of the guide layer.

An adhesive binder is applied to the filament as it is wound. After cure of the binder several sacrificial filament layers, which are laid down on the guide wire before the actual filament, are removed allowing the winding to be removed from the mandrel. In this manner, the baselayer can remain on the mandrel and may be used again.

The guide wire layer may be laid down by a bi-filar technique in which two wires of differing diameters (e.g., 6 and 3 mils over a 5 mil wire base) are wound side-by-side and the larger wire removed leaving the desired gap to receive the filament.

BRIEF DESCRIPTION OF THE DRAWINGS

FIG. 3 is a side elevational view of a mandrel and winding of the present invention.

FIG. 4 is a side elevational view of a mandrel with removable flanges.

FIGS. 5A and 5B are pictorial views of windings in accordance with the present invention.

DETAILED DESCRIPTION OF THE INVENTION

As used herein, "pitch" means the axial advance of the winding associated with one turn.

As used herein, the term "filament" means optical fiber, but may also include more generally, wires, fibers, tubes, hoses and other items to be wound.

Figure 1A:
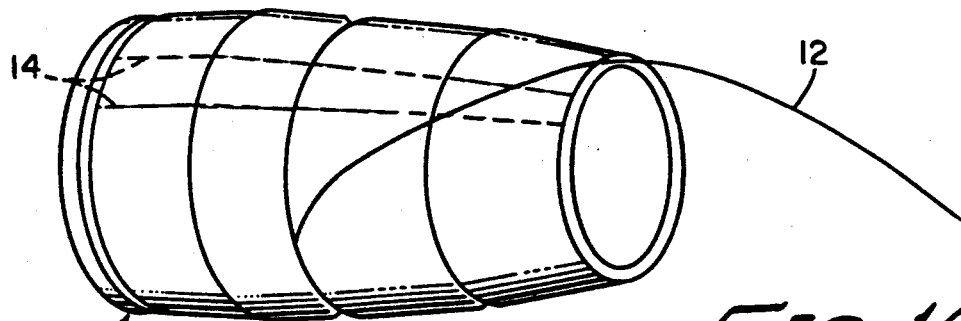
FIG 1A is a perspective view of a prior art winding.

Turning now to the drawings and particularly FIG. 1A, a filament dispenser 10 of the prior art is shown having tapered construction in order to reduce drag on the filament 12 as it is removed from one end. A first deficiency is that the tapered construction is not volumetrically efficient. Also, since alternative layers are oppositely wound, there is the matter of maintaining regular cross-over geometry in order to achieve a precision filament winding. Dashed lines 14 define the area within which the crossovers typically occur on a winding spool.

Figure 1B:
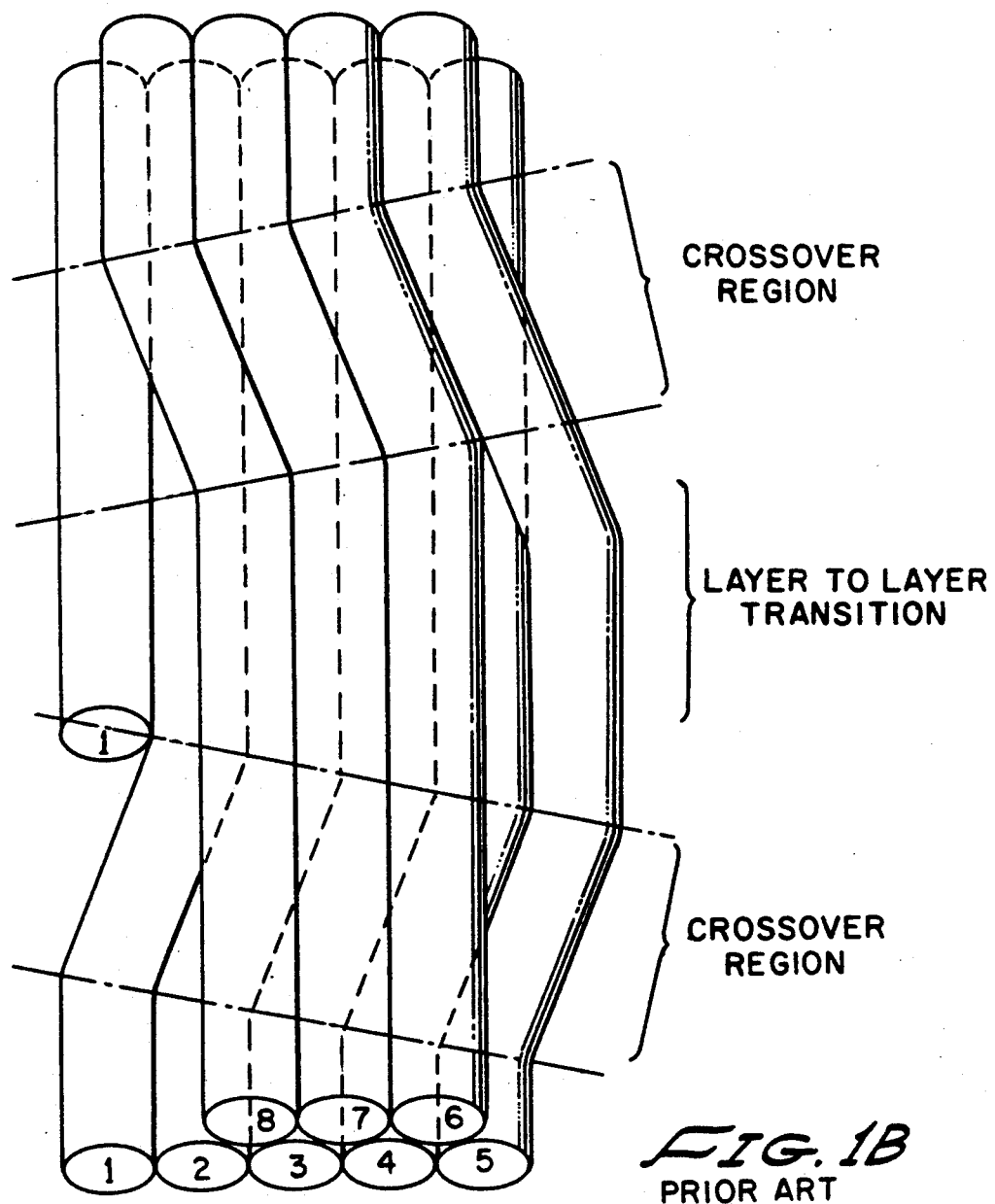
FIG. 1B is a stylized illustration of uncontrolled crossovers appearing in prior art windings.

Alternate winding layers have been wound as righthand and lefthand helixes, which results in a filament crossing over an underlying filament twice each turn. In the past, precision filament winding was only achieved by interrupting winding to manually adjust (massage) crossovers or risk winding disturbances that result from uncontrolled crossover patterns. A typical crossover pattern obtained heretofore is shown in FIG. 1B. Not only can improper crossovers (e.g., stacked in one or a few positions) interfere with winding, they can also prevent formation of squared ends which are desirable for inside payout applications.

Figure 2A:
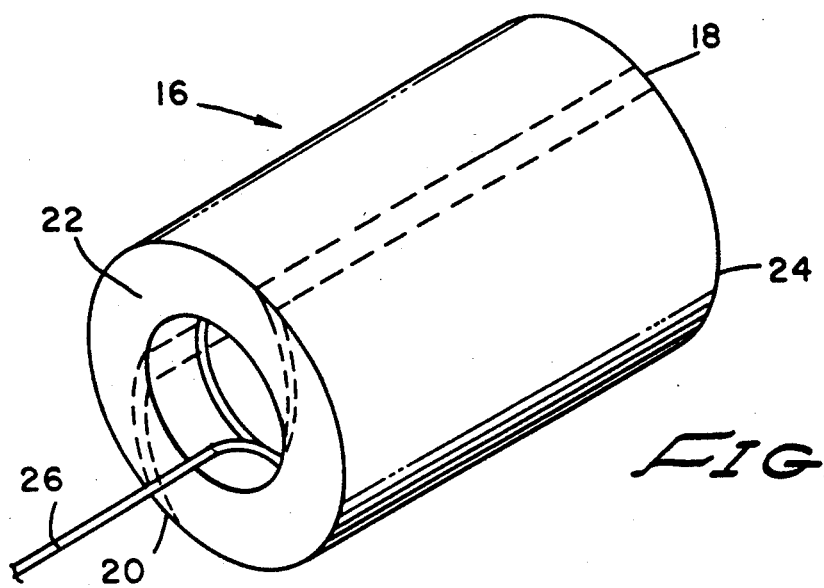
FIG. 2A is a perspective view of an inside payout filament winding.
Figure 2D:
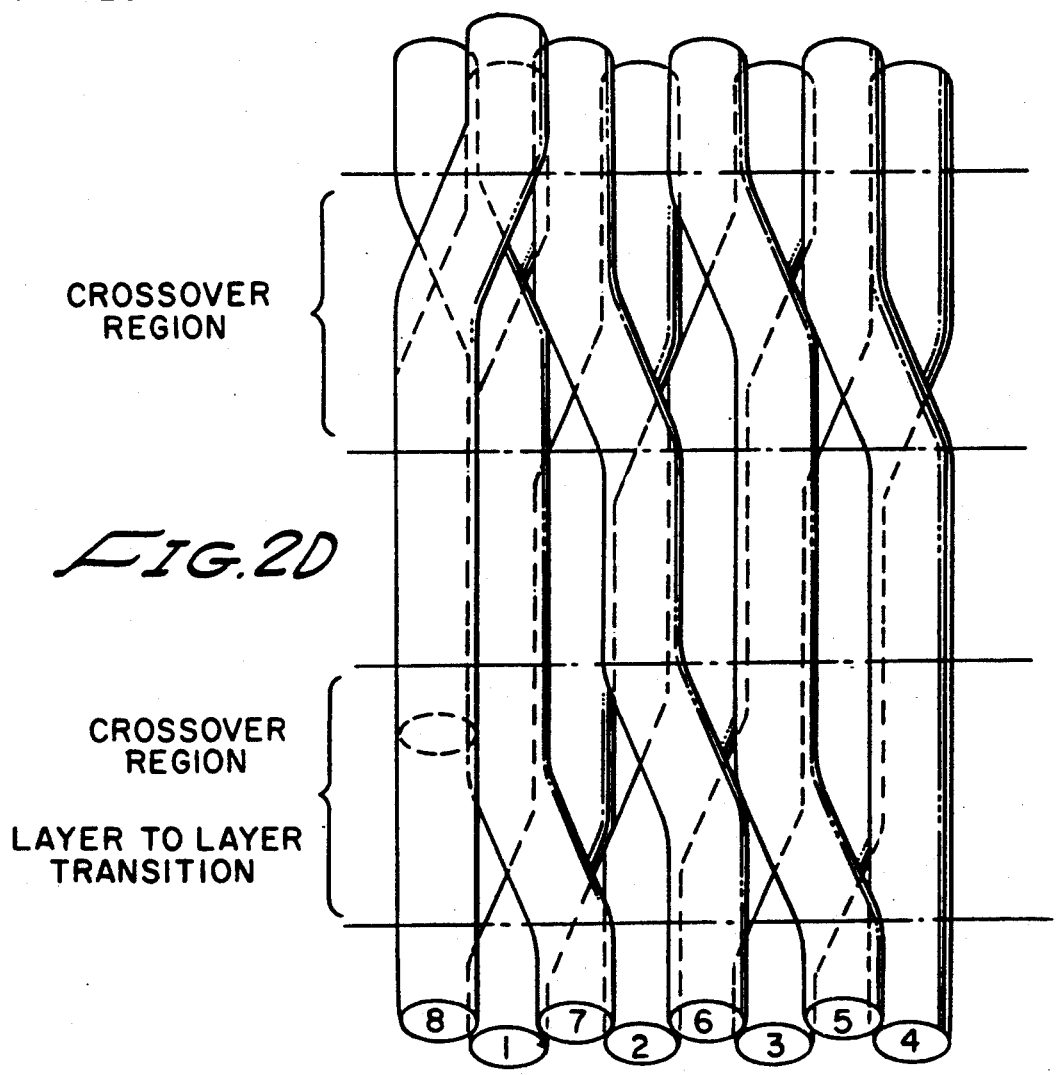
FIG. 2D is a stylized depiction of an alternative winding geometry.
Figure 2B:
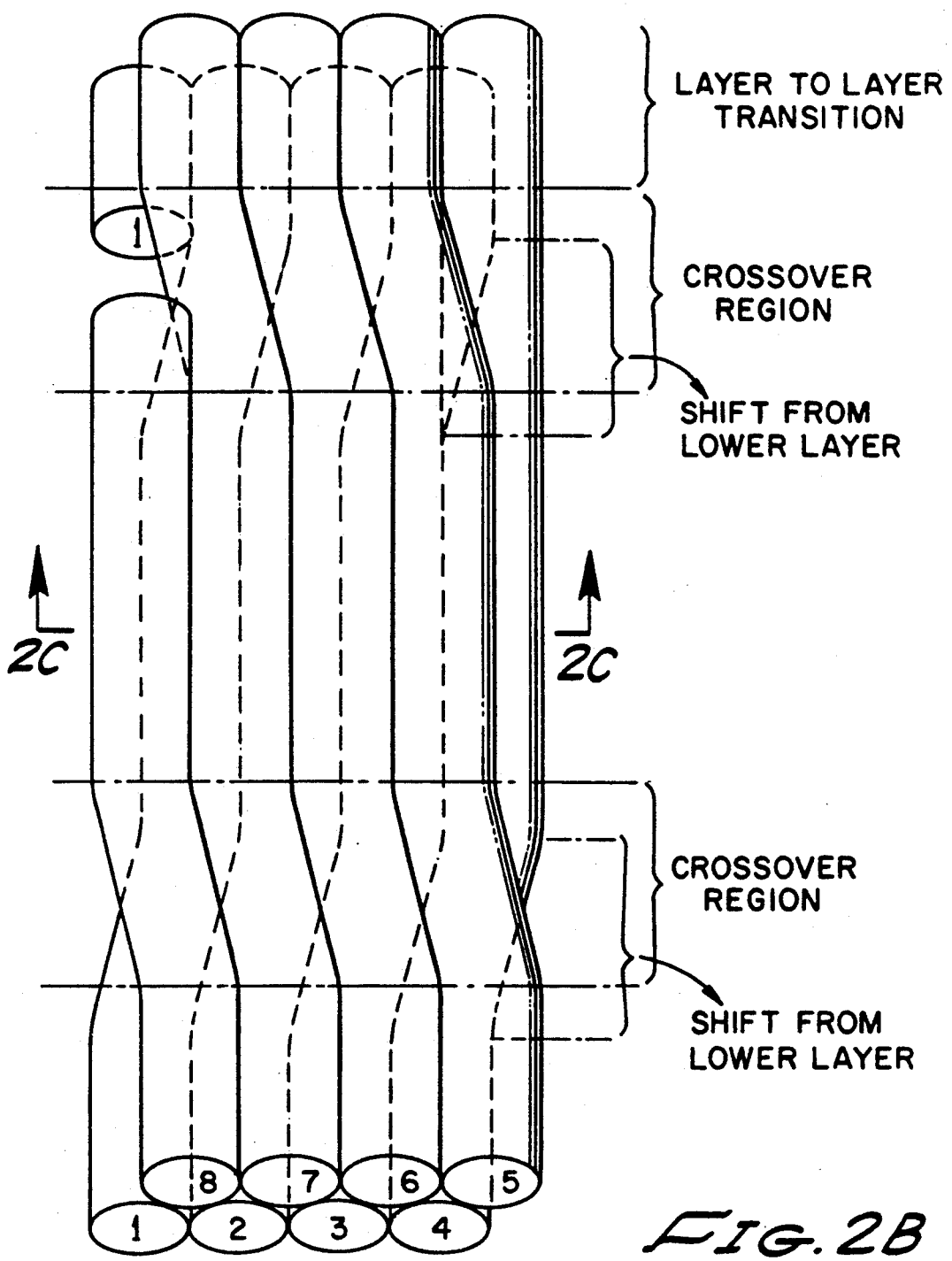
FIGS. 2B and 2C are a stylized depiction of a winding of the invention having improved crossovers and sectional view thereof.
Figure 2C:
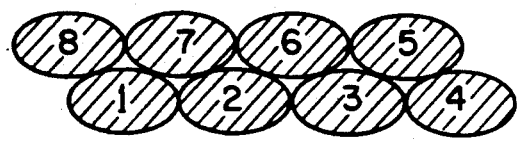

Reference is now made to FIGS. 2A-2C depicting filament windings according to this invention. FIG. 2A shows an inside payout winding 16 with two crossover regions 18 and 20 and having squared ends 22 and 24. The winding has an overall cylindrical shape and the filament 26 pulls off from the coil interior in what is termed inside payout. It is seen that the crossover region rotates or precesses about the winding which distributes potential crossover buildups in the crossover regions.

FIGS. 2B and 2C show the improved crossover arrangement in more detail and particularly as they occur in closely packed and deep nested versions, respectively.

FIG. 4 depicts a winding form 28 especially advantageous in practicing this invention including a generally cylindrical mandrel 30 with two removable flanges 32 and 34 secured onto the two ends of the mandrel in a manner that permits axial position and tilt to be precisely adjusted to the required position relative to the pattern on the mandrel. Each flange has a flat face 36 which extends radially away from the mandrel circumferential surface. The winding space 38 defined by the circumferential mandrel surface and the two flange faces 36 will be either rectangular or square in cross-section depending upon the axial spacing of the flanges along the mandrel. A filament winding developed in space 38 and which squares off against faces 36 will possess the optimum volumetric efficiency, all other things equal.

For the ensuing details of a first embodiment of this invention reference is now made to FIG. 3. The mandrel 30 is seen to specifically include a first or major circumferential surface 40 of a first diameter, a second circumferential surface 42 of a second diameter greater than the first, the latter surface being located adjacent a mandrel end and extending for only a relatively short axial distance. A conical wall 44 joins the surfaces 40 and 42, the angle of juncture with 42 exceeding 90 degrees. It is assumed that a winding is to be made from an optical fiber 46. Before beginning the optical fiber winding and before locating the flanges 32 and 34 in place on the mandrel, one layer of a base wire 48 is helically wound onto the mandrel surface 40, substantially covering the surface with the last turn 50 raised slightly onto the conical wall or lip 44 which wedges the base wire layer firmly in place. This wedging is always below or underneath the subsequently wound guide layer and, therefore, does not interfere with the flanges. The base wire on completion of turn 50 continues to be wound back onto the base layer forming a guide layer 52 in which adjacent turns nest with the base layer so as to be spaced apart one wire width. The base wire ends are secured by conventional anchor, for example, (not shown) fixedly locating the base and guide layers to the mandrel. The flanges extend over the first few turns of the base and guide layers at each end which may produce some irregularity at the ends in the final winding. A slight space 54 exists between the flanges inner surface and the outermost part of the guide layer permitting ready mounting and removal of the flange without disturbing either the guide or base layers.

On the opposite side of the mandrel, the guide wires of layer 52 are displaced by one base wire diameter because of the half-pitch advance steps. This results in a half-winding pitch gap between the flange surface 36 and the optical fiber filament 46 in layer two 56. By this geometry each optical fiber layer ends with a half turn abutting against the flange surface 36, followed by a half turn, also abutting the flange, which is raised up to the next layer.

Figure 5A:
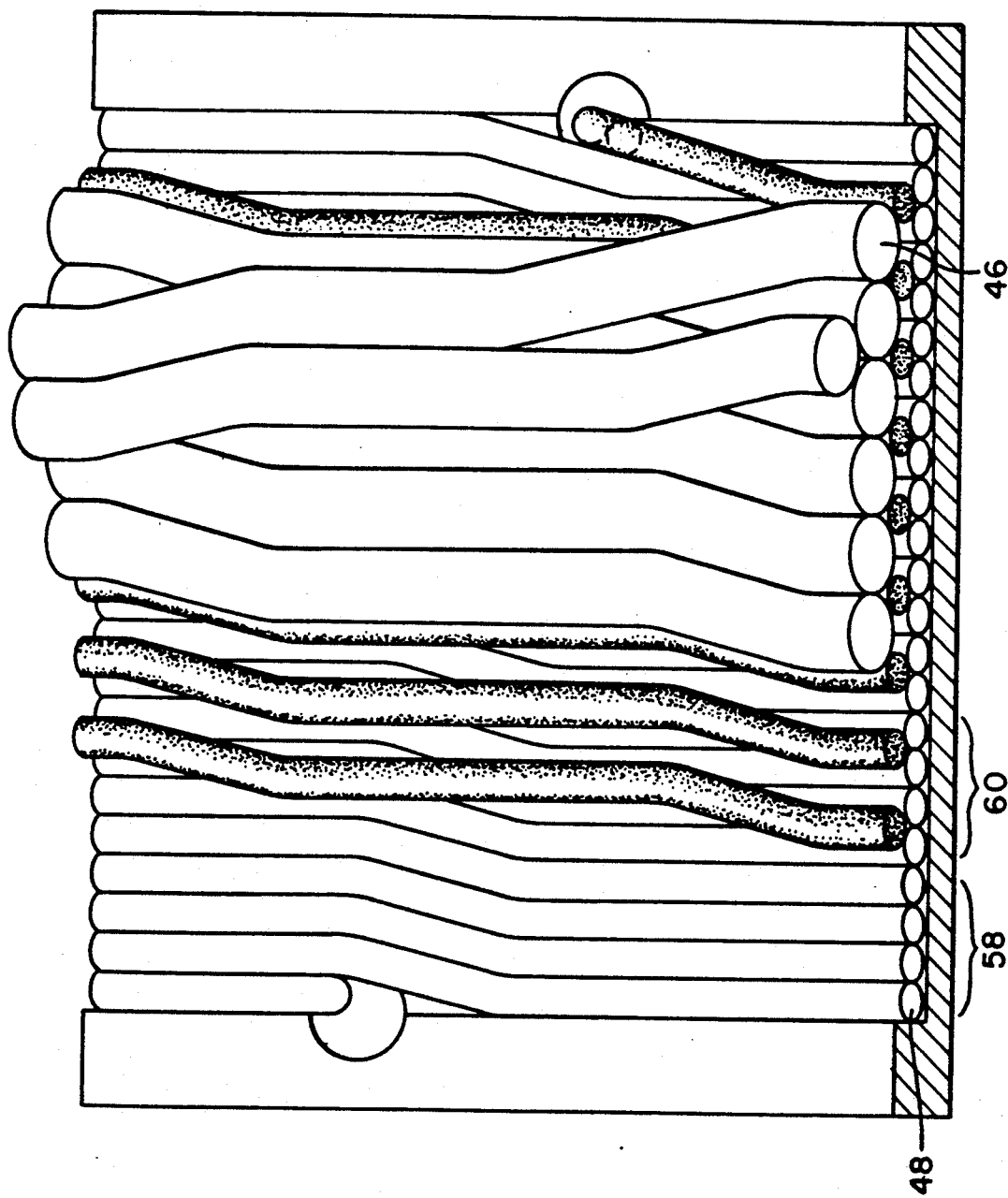

FIG. 5A is a pictorial view showing both plan and filament end views of a winding made in the manner described. For ease of understanding, a portion 58 of the base wire 48 layer is shown with no covering layers, and similarly several guide wires are left exposed and enumerated as 60.

Figure 6A:
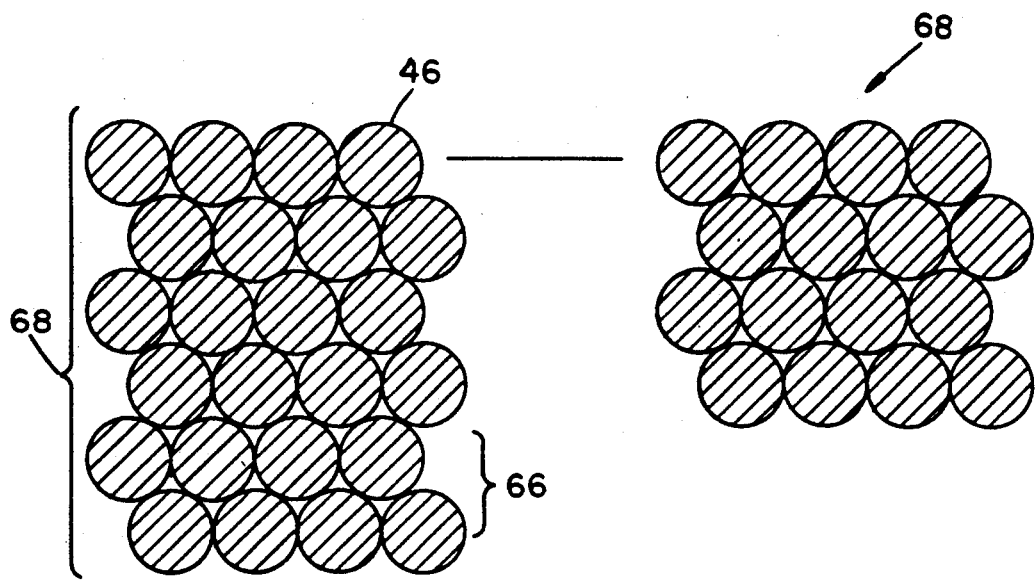
FIGS. 6A and 6B are pictorial views showing windings with sacrificial layers removed.
Figure 6B:
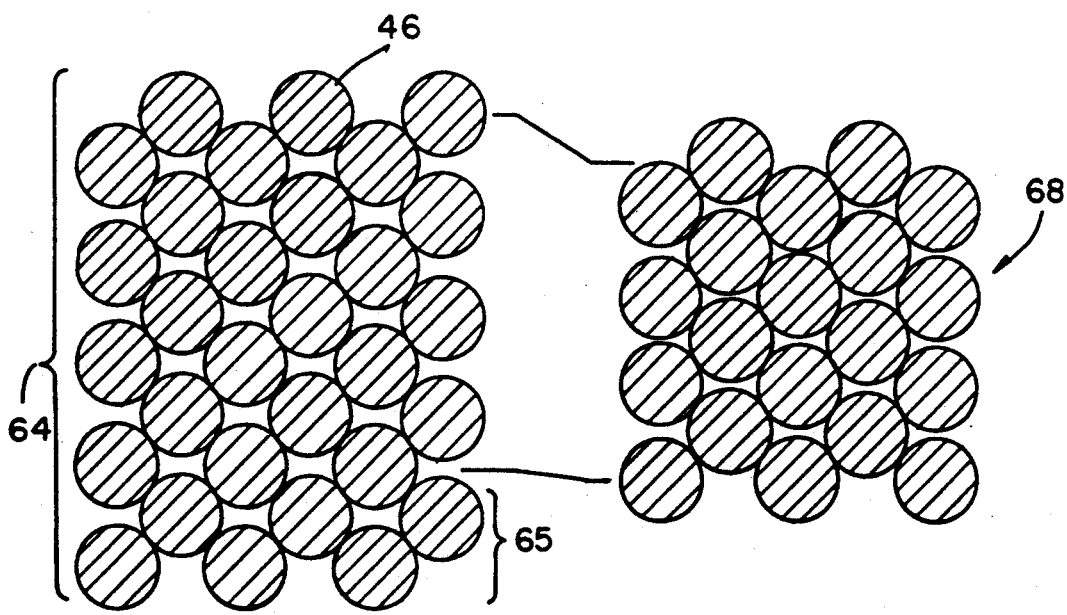

During development of the optical filament winding 64 on the mandrel (FIG. 3), an adhesive binder is applied to the filament which causes the winding to be maintained unitary. On completion of the winding, the flanges are removed and several of the innermost optical filament layers 66 are pulled out and destroyed which allows the winding proper to be taken off the mandrel (FIGS. 6A and 6B). The base wire and guide layers can remain on the mandrel and may be reused. Not only does removing the sacrificed layers 66 enhance winding removal from the mandrel, but also reduces filament tensile stresses that may have been produced during winding.

The resultant or final winding enumerated as 68 has squared off outer surfaces providing a substantially rectangular cross-section which is volumetrically efficient (FIG. 2A). Also, since the crossovers are symmetrically arranged filament payout in use can be made from the inside of the winding without stressing the filament unduly or producing micro-bending known to reduce optical signal transmission.

For the following description of a second embodiment of the invention reference should be made to FIG. 5B. The primary difference from the first described embodiment is the way in which the guide wires are laid down on the base layer in order to obtain the spaced apart relation necessary for nesting the larger diameter filament winding therebetween. The first or base layer 62 may be formed either by winding left to right or right to left except that the wire ends have to be secured to the mandrel. The second or guide layer is formed by a "bi-filar" technique in which two wires, a large diameter wire 70 and a smaller diameter wire 72, are wound side by side to form the entire layer. Then, the larger diameter wire 70 is removed leaving the smaller diameter wire 72 nested in the base layer and spaced apart to receive the optical fiber 46 in the spaces between the guide wire. The smaller wire then has its ends secured (not shown) and all else remains the same.

Although filaments and base wires of other dimensions may be found advantageous, excellent results were obtained with an optical fiber 46 having a diameter of approximately 0.010 inches, a base wire 48 of 0.005 inches, a large diameter wire 70 of 0.006 inches and a smaller diameter guide wire 72 of 0.003 inches.

Although several somewhat preferred embodiments have been disclosed and described in detail herein, it should be understood that this invention is in no sense limited thereby and its scope is to be determined by that of the appended claims.

What is claimed is:

1. A method of forming a densely packed winding from a filament of given diameter, comprising the steps of:

providing a mandrel with a radially extending flange;

wrapping a base wire on the mandrel to form a first layer;

wrapping a second layer over the first layer using first and second guide wires in side-by-side relation;

removing the second guide wire leaving a space between adjacent turns of the first guide wire; and wrapping a first layer of the filament nesting in the spaces between the first guide wire turns, and subsequent layers formed by reversing the direction of wrapping over the underlying layer, an outermost turn of each layer contacting the flange.

2. A method as in claim 1, including the steps of: applying an adhesive to the filament during wrapping, and removing at least the first filament layer and removing the remaining filament layers as a unit from the mandrel.

3. A method as in claim 1, in which the first guide wire is smaller in diameter than the base wire and the second guide wire is larger.

* * * * *